United States Patent
Horner et al.

(10) Patent No.: US 7,549,916 B2
(45) Date of Patent: Jun. 23, 2009

(54) CABIN PRESSURE CONTROL SYSTEM AND METHOD THAT IMPLEMENTS HIGH-SPEED SAMPLING AND AVERAGING TECHNIQUES TO COMPUTE CABIN PRESSURE RATE OF CHANGE

(75) Inventors: Darrell W. Horner, Oro Valley, AZ (US); Gerard L. McCoy, Tucson, AZ (US); Timothy C. Biss, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 101 days.

(21) Appl. No.: 11/178,038

(22) Filed: Jul. 8, 2005

(65) Prior Publication Data
US 2007/0010188 A1    Jan. 11, 2007

(51) Int. Cl.
*B64D 13/02* (2006.01)
*H03M 1/48* (2006.01)

(52) U.S. Cl. .......................... 454/72; 341/116; 341/115
(58) Field of Classification Search ................... 454/72; 341/116, 155
See application file for complete search history.

(56) References Cited

U.S. PATENT DOCUMENTS

| | | | |
|---|---|---|---|
| 4,199,817 A | 4/1980 | Conkling et al. | |
| 4,336,590 A * | 6/1982 | Jacq et al. | 128/204.21 |
| 4,553,474 A | 11/1985 | Wong et al. | |
| 4,720,807 A | 1/1988 | Ferran et al. | |
| 5,273,486 A | 12/1993 | Emmons et al. | |
| 5,428,357 A * | 6/1995 | Haab et al. | 341/155 |
| 5,517,307 A * | 5/1996 | Buehring et al. | 356/494 |
| 5,520,578 A | 5/1996 | Bloch et al. | |
| 5,590,852 A | 1/1997 | Olson | |
| 5,781,142 A | 7/1998 | Onodera et al. | |
| 6,094,627 A | 7/2000 | Peck et al. | |
| 6,271,736 B1 | 8/2001 | Kim | |
| 6,317,071 B1 | 11/2001 | Kolsrud et al. | |
| 6,676,504 B2 | 1/2004 | Petri et al. | |
| 6,746,322 B2 | 6/2004 | Scheerer et al. | |
| 2002/0193063 A1 | 12/2002 | Scheerer et al. | |
| 2004/0102150 A1 | 5/2004 | Horner | |
| 2004/0238039 A1 | 12/2004 | Friedrichs et al. | |

OTHER PUBLICATIONS

European Search Report EP 06 11 6812, Nov. 23, 2006.
Bulut, T., Herzog, A., Schmidt K.; "Zeitreihen" Feb. 19, 2002, pp. 1-24.

* cited by examiner

*Primary Examiner*—Steve McAllister
*Assistant Examiner*—Helena Kosanovic
(74) *Attorney, Agent, or Firm*—Oral Caglar, Esq.

(57) ABSTRACT

An aircraft cabin pressure control system and the method implement a technique that oversamples and filters a sensed cabin pressure signal, and then differentiates the oversampled and filtered pressure signal to generate cabin pressure rate-of-change. The oversampling and filtering technique removes circuit and sensor induced noise from the cabin pressure signal, and results in cabin pressure rate-of-change values with less noise than currently known systems and methods.

25 Claims, 2 Drawing Sheets

CABIN PRESSURE CONTROL SYSTEM AND METHOD THAT IMPLEMENTS HIGH-SPEED SAMPLING AND AVERAGING TECHNIQUES TO COMPUTE CABIN PRESSURE RATE OF CHANGE

TECHNICAL FIELD

The present invention relates to aircraft cabin pressure control and, more particularly, to an aircraft cabin pressure control system and method for computing cabin pressure rate of change.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin altitude," which refers to the normal atmospheric pressure existing at a certain altitude. Studies have shown that the symptoms of hypoxia may become noticeable when the cabin altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin altitude to minimize passenger discomfort.

To accomplish the above functions, some cabin pressure control systems implement control laws that use cabin pressure rate of change as an input. In many of these systems, the cabin pressure rate of change is sensed, either using an analog or a digital pressure, and compared to a desired cabin pressure rate of change to determine a "rate error." The rate error may then be used in the control laws to drive a motor or other actuator, which in turn moves an outflow valve to a position that causes the cabin pressure to vary at the desired cabin pressure rate of change.

Although most cabin pressure control systems that implement cabin pressure rate of change control laws operate safely, reliably, and robustly, these systems can suffer certain drawbacks. In particular, the sensed cabin pressure rate of change value can be noisy about the actual cabin pressure rate of change. For example, if sensed cabin pressure is differentiated using an analog circuit, the circuit typically includes a relatively high-gain rate amplifier that is susceptible to electrical noise. Alternatively, if the sensed cabin pressure is differentiated using software, the sensed cabin pressure is typically differentiated over relatively short time periods (e.g., 0.025 to 0.050 seconds) using relatively high-resolution (e.g., ≧19-bit resolution) analog-to-digital conversion circuits that have the same noise susceptibility as the rate amplifier.

The sensed rate noise noted above can cause the control laws to undesirably supply commands to the outflow valve motor that cause motor dither. Motor dither can cause wear on both the outflow valve motor and other components, such as gearing, that may couple to the motor to the outflow valve. Moreover, if the analog-to-digital conversion circuit is implemented as part of the cabin pressure sensor (e.g., a so-called "digital sensor"), this can result in increased sensor cost, increased transducer circuit cost, and/or relatively large sensor and circuit footprint.

Hence, there is a need for a cabin pressure control system and method that is less susceptible to circuit noise, and/or reduces or eliminates motor dither and thus motor and gear wear, and/or that can be implemented with lower cost pressure sensors and circuits. The present invention addresses one or more of these needs.

BRIEF SUMMARY

The present invention provides a cabin pressure control system and method that is less susceptible to circuit noise, and/or reduces or eliminates motor dither and thus motor and gear wear, and/or that can be implemented with lower cost pressure sensors and circuits.

In one embodiment, and by way of example only, an aircraft cabin pressure control system includes a cabin pressure sensor, an analog-to-digital converter (A/D) circuit, and a controller circuit. The cabin pressure sensor is configured to sense aircraft cabin pressure and supply a cabin pressure signal representative thereof. The A/D circuit is coupled to receive the cabin pressure signal and is operable, upon receipt thereof, to periodically sample the cabin pressure signal and supply digital cabin pressure values representative thereof. The controller circuit is configured to periodically read a predetermined number of the digital cabin pressure values supplied from the A/D circuit and to periodically compute a single cabin pressure value from the predetermined number of digital cabin pressure values read thereby, and periodically compute aircraft cabin pressure rate of change based in part on the single aircraft cabin pressure value.

In another exemplary embodiment, a circuit for determining aircraft cabin pressure rate of change includes an analog-to-digital converter (A/D) circuit and a controller circuit. The A/D circuit is adapted to receive an analog cabin pressure signal and is operable, upon receipt thereof, to periodically sample the analog cabin pressure signal and supply digital cabin pressure values representative thereof. The controller circuit is configured to periodically read a predetermined number of the digital cabin pressure values supplied from the A/D circuit and to periodically compute a single cabin pressure value from the predetermined number of digital cabin pressure values read thereby, and periodically compute aircraft cabin pressure rate of change based in part on the single aircraft cabin pressure value.

In yet another exemplary embodiment, a method of periodically computing aircraft cabin pressure rate of change includes sampling, at a predetermined sampling frequency, an analog aircraft cabin pressure signal to thereby generate digital cabin pressure values. An average of a predetermined number of the digital cabin pressure values is computed, at a predetermined computation frequency that is less than the predetermined sampling frequency, to thereby generate average cabin pressure values. Aircraft cabin pressure rate of change values are computed, at the predetermined computation frequency, based on the average aircraft cabin pressure values.

Other independent features and advantages of the preferred cabin pressure control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the description, it is to be appreciated that the following detailed description is merely exemplary in nature and is not intended to limit the invention or the application and uses of the invention. Furthermore, there is no intention to be bound by any theory presented in the preceding background or the following detailed description.

Figure 1:
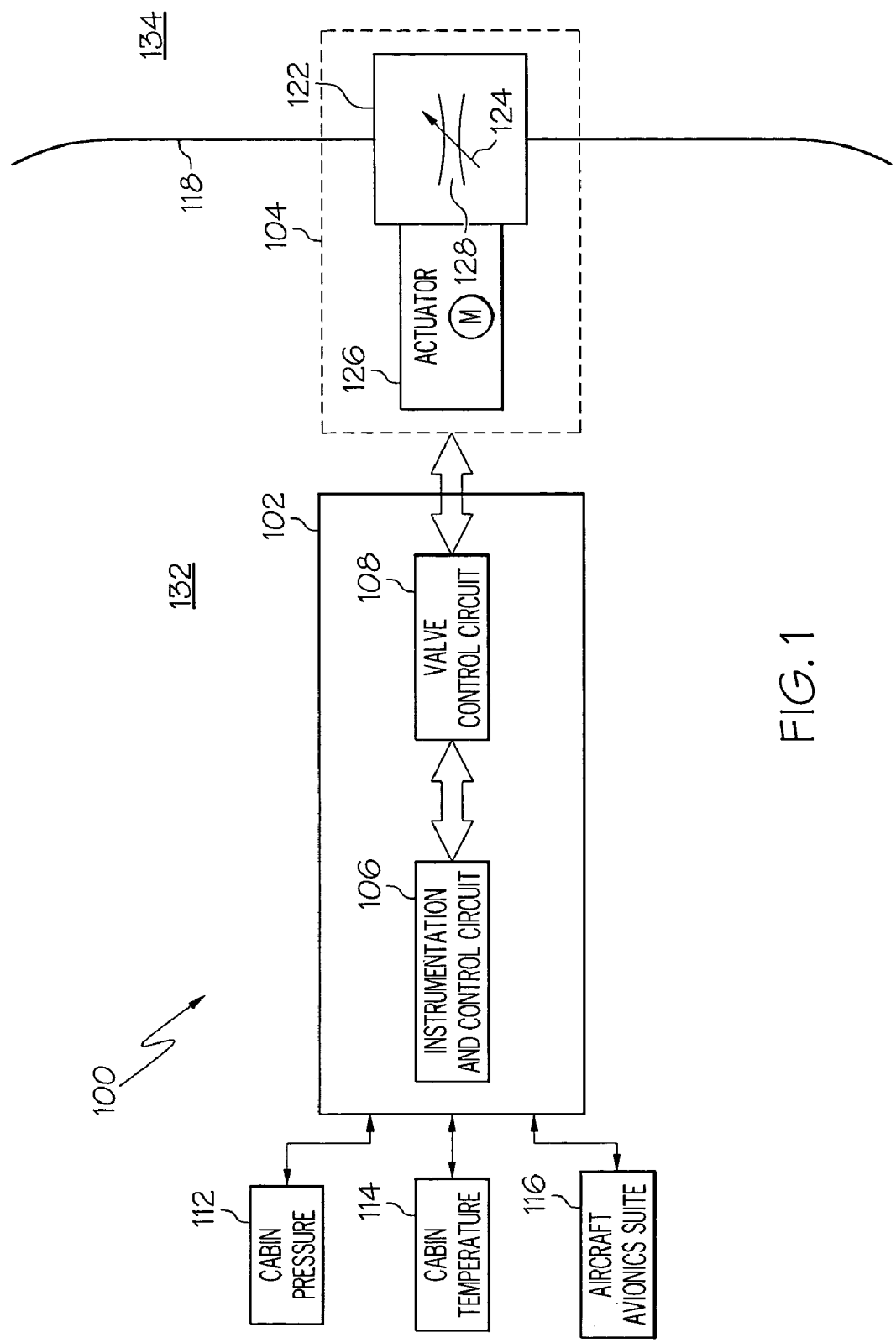
FIG. 1 is a functional block diagram of an aircraft cabin pressure control system according to an embodiment of the present invention.

Turning now to FIG. 1, a functional block diagram of an exemplary aircraft cabin pressure control system 100, and its interconnections to certain other aircraft systems, is shown. In the depicted embodiment, the system 100 includes a control unit 102 and an outflow valve 104. Although not depicted, it will be appreciated that the system 100 may additionally include one or more overpressure relief valves, and one or more negative pressure relief valves. These valves are typically included as part of an aircraft cabin pressure control system but, for clarity and ease of illustration and depiction, are not shown or further described herein. Moreover, before proceeding further with the description of the system 100, it is noted that the depicted embodiment is merely exemplary and that the system 100 could be implemented with two or more independent control units 102, and two or more outflow valves 104.

The control unit 102 includes an instrumentation and control circuit 106 and a valve control circuit 108. The instrumentation and control circuit 106 is coupled to receive signals from a plurality of sensors and other signal sources. In the depicted embodiment, the sensors include a cabin pressure sensor 112, and a cabin temperature sensor 114. It will be appreciated that the sensors 112, 114 depicted and described herein are merely exemplary, and that the system 100 could be implemented with additional or different types of sensors. For example, the system 100 could additionally include one or more atmosphere pressure sensors and/or one or more cabin-to-atmosphere differential pressure sensors.

The cabin pressure sensor 112 is disposed and configured to sense absolute cabin pressure, and is preferably implemented as any one of numerous types of analog pressure sensors. Some non-limiting examples of suitable analog pressure sensors include various semiconductor diaphragm pressure sensors, various capacitance pressure sensors, various optical sensors, and various magnetic sensors. In a particular preferred embodiment, however, the cabin pressure sensor 112 is implemented as a piezoelectric strain gauge sensor.

The cabin temperature sensor 114 is disposed and configured to sense cabin temperature, and is also preferably implemented as any one of numerous types of analog temperature sensors. Some non-limiting examples of suitable temperature sensors include resistance temperature detectors (RTDs), thermocouples, and various types of optical temperature sensors. In a particular preferred embodiment, the cabin temperature sensor 114 is implemented as a RTD. As will be described more fully below, the cabin temperature sensor 114 is included to correct the absolute pressure value sensed by the cabin pressure sensor 112 for environmental temperature changes. It will be appreciated, however, that the temperature sensor 114 may be omitted if the cabin pressure sensor 112 is sufficiently accurate that temperature correction need not be implemented.

The instrumentation and control circuit 106 also communicates with, and receives signals from, the aircraft avionics suite 116 via, for example, ARINC-429, analog, and/or discrete input/output signals. Based on the signals received from the avionics suite 116, as well as signals supplied from the sensors 112, 114, the instrumentation and control circuit 106 computes cabin pressure rate-of-change, temperature corrected cabin pressure, supplies appropriate actuation control signals to the valve control circuit 108, and additionally supplies various alarm, indication, warning, and/or control signals.

The valve control circuit 108 receives the actuation control signals supplied from the instrumentation and control circuit 106. In response to the actuation control signals, which preferably include speed information and direction information, the valve control circuit 108 supplies valve command signals to the outflow valve 104, to thereby control the position of the outflow valve 104, and thereby modulate cabin pressure.

The outflow valve 104 is preferably mounted on an aircraft bulkhead 118, and includes a valve body 122, a valve element 124, and a valve actuator 126. The valve body 122 has a flow passage 128 that extends through it, such that when the outflow valve 104 is mounted on the aircraft bulkhead 118, the flow passage 128 is in fluid communication with the aircraft cabin 132 and the external atmosphere 134. The valve element 124 is movably mounted on the valve body 122 and extends into the flow passage 128. The valve element 124 is movable between an open position, in which the aircraft cabin 132 and the external atmosphere 134 are in fluid communication, and a closed position, in which the aircraft cabin 132 is sealed from the external atmosphere.

The valve actuator 126 is coupled to the valve element 124 and positions the valve element 124 to a commanded position, to thereby control cabin pressure. To do so, the valve actuator 126 is coupled to receive the valve command signals supplied by the valve control circuit 108. In response to the supplied valve command signals, the valve actuator 126 moves the valve element 124 to the commanded position. It will be appreciated that the valve actuator 126 may be implemented as any one of numerous types of actuators, but in the depicted embodiment the valve actuator 126 is implemented as a motor.

Figure 2:
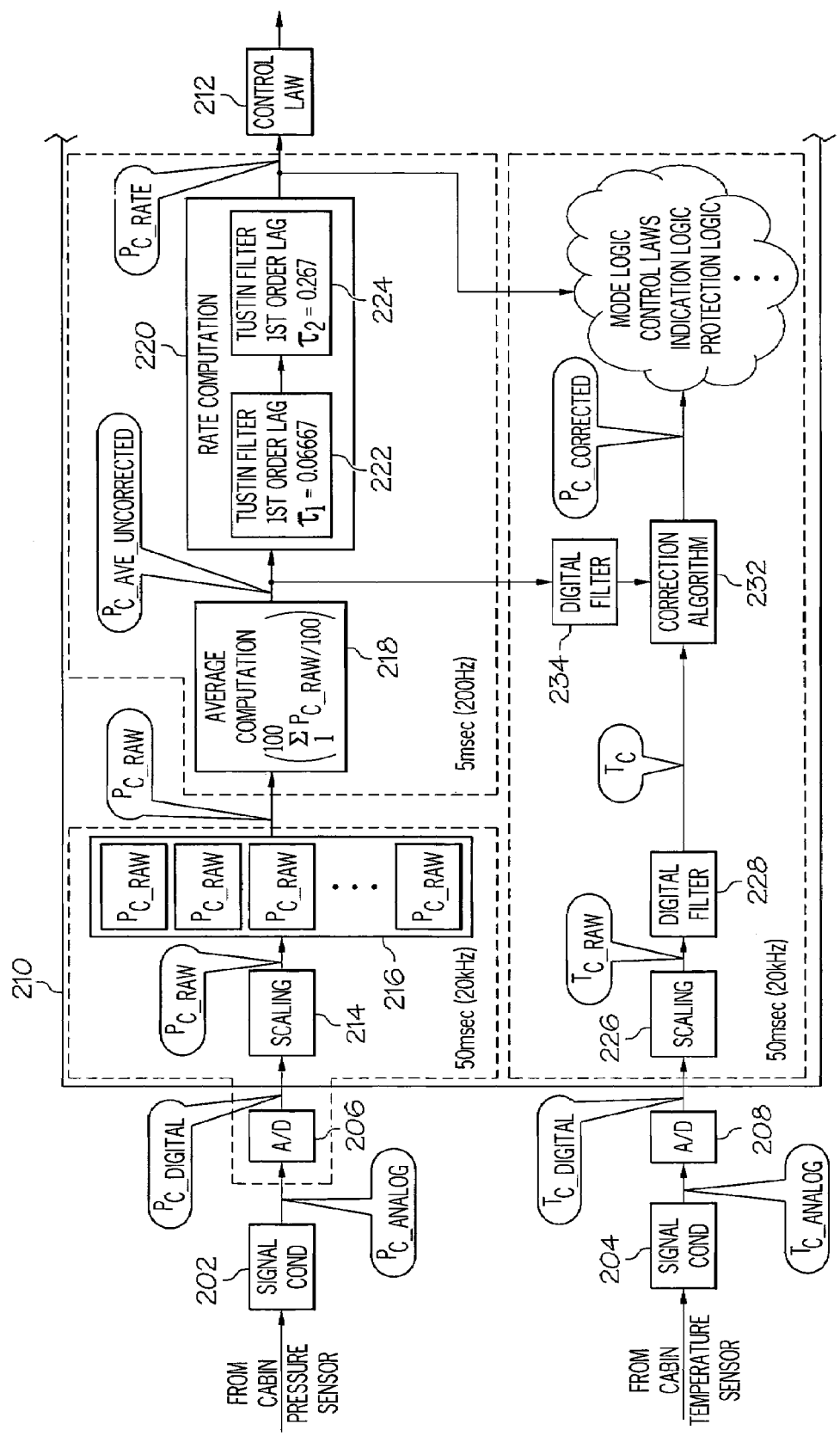
FIG. 2 is a functional block diagram of a portion of an exemplary instrumentation and control circuit that may be used to implement the system shown in FIG. 1.

Turning now to FIG. 2, a more detailed description of a portion of the instrumentation and control circuit 106 will be provided. As FIG. 2 illustrates, the instrumentation and control circuit 106, at least in the depicted embodiment, includes a pressure signal conditioning circuit 202, a temperature signal conditioning circuit 204, a pressure signal analog-to-digital converter (A/D) circuit 206, a temperature signal A/D circuit 208, and a controller circuit 210. The pressure and temperature signal conditioning circuits 202, 204 receive analog pressure and temperature signals supplied by the cabin pressure sensor 112 and the cabin temperature sensor 114, respectively, and properly condition and filter the analog pressure and temperature signals for further processing. In the depicted embodiment, the pressure and temperature signal conditioning circuits 202, 204 each include, for example, a filter and an amplifier circuit with slope and offset compensation circuitry, and are each configured to supply a direct current (DC) signal that is proportional to the sensed cabin pressure ($P_{C\_ANALOG}$) and sensed cabin temperature ($T_{C\_ANALOG}$). It will be appreciated that the depicted signal conditioning circuits 202, 204 are only exemplary of particular physical embodiments and that other types of signal conditioning circuits could also be used to provide appropriate signal conditioning for the cabin pressure sensor 112 and cabin temperature sensor 114.

Turning now to the remainder of the circuit 106, it is seen that the conditioned cabin pressure signal ($P_{C\_ANALOG}$) is supplied to the pressure signal A/D circuit 206. The pressure signal A/D circuit 206, in a conventional manner, samples the analog cabin pressure signal ($P_{C\_ANALOG}$) at a predetermined sampling frequency and supplies digital cabin pressure values ($P_{C\_DIGITAL}$) representative of the analog cabin pressure signal ($P_{C\_ANALOG}$). The pressure signal A/D circuit 206 may be any one of numerous A/D circuits known in the art for providing this functionality, and may be implemented with various levels of resolution. In a particular preferred embodiment, however, the pressure signal A/D circuit 206 is implemented using an A/D circuit with at least 16-bits of resolution. It is additionally noted that the pressure signal A/D circuit 206 may be a separate circuit element, as illustrated in FIG. 2, or it may be an integrated part of the controller circuit 210, the function of which will now be described.

The controller circuit 210 receives the digital pressure values ($P_{C\_DIGITAL}$) supplied by the pressure signal A/D circuit 206 and, using software that is stored either externally or in on-board memory, processes the digital pressure values ($P_{C\_DIGITAL}$) to, among other things, determine the rate-of-change of cabin pressure ($P_{C\_RATE}$). The determined cabin pressure rate-of-change ($P_{C\_RATE}$) is supplied to a control law 212, which in turn supplies outflow valve position command signals to the outflow valve 104.

More specifically, the digital pressure values ($P_{C\_DIGITAL}$) supplied by the pressure signal AJD circuit 206 are scaled 214 ($P_{C\_RAW}$) and stored, at the predetermined sampling frequency, in a memory circuit 216. The memory circuit 216 is preferably implemented as part of the controller circuit 210, but may alternatively be implemented as a separate component or components. In any case, the controller circuit 210, at a predetermined computation frequency, periodically reads a predetermined number of the scaled digital cabin pressure values ($P_{C\_RAW}$) from the memory circuit 216, and processes the predetermined number of values ($P_{C\_RAW}$) to generate a single cabin pressure value therefrom that has less noise than each of the individual digital cabin pressure values, and that is uncorrected for cabin temperature.

It will be appreciated that the predetermined number of scaled digital cabin pressure values ($P_{C\_RAW}$) that are read from the memory circuit 216, and used to during the computation period to generate the single cabin pressure value, may vary. In the depicted embodiment, however, 100 values are used during each computation period. It will additionally be appreciated that the predetermined number of values may depend, for example, on the relative magnitudes of the sampling and computation frequencies, or vice-versa. Particular absolute and relative values of the sampling and computation frequencies are discussed in more detail further below.

Returning once again to the description, it is noted that the processing performed in the controller circuit 210 to generate the uncorrected cabin pressure value may vary. For example, the controller circuit 210 could implement a first-order lag Tustin filter. In the depicted embodiment, however, the controller circuit 210 implements an average computation 218 that computes an average of the predetermined number of scaled digital cabin pressure values ($P_{C\_RAW}$). Thus, the uncorrected cabin pressure value that the controller circuit generates is an average cabin pressure value that is uncorrected for temperature ($P_{C\_AVE\_UNCORRECTED}$).

The controller circuit 210 also periodically processes the uncorrected cabin pressure value ($P_{C\_AVE\_UNCORRECTED}$), at the computation frequency, to determine the cabin pressure rate-of-change ($P_{C\_RATE}$). It is noted that cabin pressure rate-of-change can be determined using uncorrected cabin pressure, since rate-of-change is a function of pressure change, rather than actual absolute pressure. Preferably, the controller circuit 210 determines the cabin pressure rate-of-change ($P_{C\_RATE}$) by implementing a digital filter circuit 220. In the depicted embodiment, the controller circuit 210 implements the filter circuit 220 as two series-coupled first order lag Tustin filters 222, 224. In an alternative embodiment, the filter circuit 220 is implemented as two parallel-coupled Tustin filters, the outputs of which are summed together and then multiplied by a unity gain term. No matter the particular configuration of the Tustin filters 222, 224, it will be appreciated that each is preferably implemented with different time constants ($\tau_1$, $\tau_2$). The specific values of the time constants ($\tau_1$, $\tau_2$) may vary depending, for example, on the specific motor control law 212 that is being implemented. In a particular exemplary physical embodiment, in which the filter circuit 220 is implemented as two series-coupled first order lag Tustin filters 222, 224, the filters 222, 224 are implemented with time constants of $\tau_1=0.06667$ and $\tau_2=0.267$, respectively.

It will be appreciated that the cabin pressure rate-of-change determination may also be implemented using any one of numerous other processes. For example, the controller circuit 210 could determine the cabin pressure rate-of-change ($P_{C\_RATE}$) by computing a difference in cabin pressure divided by an elapsed time. More specifically, the difference between the uncorrected cabin pressure value computed during the current computation period and the uncorrected cabin pressure value computed during the previous computation period is divided by the elapsed time between the current and previous computation periods, as follows:

$$\frac{(P_{C\_AVE\_UNCORRECTED_t} - P_{C\_AVE\_UNCORRECTED_{t-1}})}{\Delta t}.$$

No matter the specific manner in which the controller circuit 210 determines the cabin pressure rate-of-change ($P_{C\_RATE}$), the determined cabin pressure rate-of-change ($P_{C\_RATE}$), as was noted above, is supplied to the control law 212. The control law 212 may be implemented using any one of numerous control laws, now known or developed in the future, that use a rate-of-change variable as an input. The control law 212, based in part on the determined cabin pressure rate-of-change ($P_{C\_RATE}$), supplies the actuation control signals to the valve control circuit 108, which in turn supplies the valve command signals to the outflow valve actuator 126 to move the outflow valve element 124.

Before proceeding further, it is noted that the predetermined sampling frequency and the predetermined computation frequency are preferably different values. Moreover, the predetermined sampling frequency is preferably greater in magnitude than the predetermined computation frequency, to implement suitable oversampling of the analog pressure signal ($P_{C\_ANALOG}$). Although the relative sampling and computation frequency magnitudes may vary, and may, as was mentioned above, depend on or affect the predetermined number of scaled digital cabin pressure values ($P_{C\_RAW}$) read and used in each computation period, in the depicted embodiment the sampling frequency is 100 times greater than the computation frequency. For example, in a particular preferred implementation, the sampling frequency is 20 kHz, and the computation frequency is 200 Hz. Thus, the pressure signal A/D circuit 206 supplies a new scaled digital cabin pressure value ($P_{C\_RAW}$) to the memory circuit 216 every 50 microseconds, and the controller circuit 210 reads a new set of the predetermined number (e.g., 100) of scaled digital cabin pressure values ($P_{C\_RAW}$) from the memory circuit 216 and computes a new average cabin pressure value ($P_{C\_AVE\_UNCORRECTED}$) every 50 milliseconds.

Returning once again to the circuit description, and as FIG. 2 also shows, the conditioned analog cabin temperature signal ($T_{C\_ANALOG}$) supplied by the temperature signal conditioning circuit 204 is supplied to the temperature signal A/D circuit 208. The temperature signal A/D circuit 208, in a conventional manner, samples the analog cabin temperature signal ($T_{C\_ANALOG}$) at a second predetermined sampling frequency and supplies digital cabin temperature values ($T_{C\_ANALOG}$) representative of the analog cabin temperature signal ($T_{C\_ANALOG}$). The temperature signal A/D circuit 208 may be any one of numerous A/D circuits known in the art for providing this functionality, and may be implemented with various levels of resolution. In a particular preferred embodiment, however, the temperature signal A/D circuit 208 is implemented using an A/D circuit with at least 10-bits of resolution. It is additionally noted that the temperature signal A/D circuit 208 may be a separate circuit element, as illustrated in FIG. 2, or it may be an integrated part of the controller circuit 210.

The controller circuit 210 receives the digital cabin temperature values ($T_{C\_DIGITAL}$) supplied by the temperature signal A/D circuit 208 and, using software that is stored either externally or in on-board memory, processes the digital cabin temperature values ($T_{C\_DIGITAL}$) and the uncorrected cabin pressure value ($P_{C\_AVE\_UNCORRECTED}$) to generate a corrected cabin pressure ($P_{C\_CORRECTED}$). The corrected cabin pressure ($P_{C\_CORRECTED}$) and the cabin pressure rate-of-change ($P_{C\_RATE}$) are both supplied to various other cabin pressure control logic and functions that may implement be implemented by the controller circuit 210, or implemented in one or more circuits separate from the controller circuit 210. Some non-limiting examples of these various control logic and functions include mode logic, one or more control laws, indication logic, and protection logic.

To implement the above-described functionality, the digital temperature values ($T_{C\_DIGITAL}$) supplied by the temperature signal A/D circuit 208 are periodically scaled 226 ($T_{C\_RAW}$), run through a third digital filter 228 ($T_C$), and supplied to a correction algorithm 232 at a second predetermined computation frequency. In addition, the controller circuit 210, at the second predetermined computation frequency, periodically reads an uncorrected cabin pressure value ($P_{C\_AVE\_UNCORRECTED}$), runs the uncorrected cabin pressure value ($P_{C\_AVE\_UNCORRECTED}$) through a fourth digital filter 234, and supplies the filtered values to the correction algorithm 232. The correction algorithm 232, which may be any one of numerous known pressure-temperature correction algorithms, processes the filtered temperature values ($T_C$) and the filtered uncorrected cabin pressure value ($P_{C\_AVE\_UNCORRECTED}$), at the second predetermined computation frequency, and supplies a temperature compensated cabin pressure value ($P_{C\_CORRECTED}$).

As with the sampling and computation frequencies associated with the pressure signal, the second predetermined sampling and computation frequencies implemented by the controller circuit 210 may also vary. Preferably, however, these frequency magnitudes are equal in value, and in a particular preferred embodiment the second sampling and computation frequencies are both 20 Hz. Thus, a new corrected cabin pressure value ($P_{C\_CORRECTED}$) is generated and utilized, and a new cabin pressure rate-of-change ($P_{C\_RATE}$) is sampled and utilized, every 50 milliseconds.

The cabin pressure control system 100, and the method implemented thereby, oversamples and averages (or filters) the sensed cabin pressure signal, which removes circuit and sensor induced noise therefrom, and then differentiates the averaged pressure signal to generate cabin pressure rate-of-change. The system and method generate cabin pressure rate-of-change values that have less noise than currently known systems and methods, and provide suitable sensed pressure input resolution so that the supplied cabin pressure rate-of-change value is usable by the control laws.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft cabin pressure control system, comprising:
a cabin pressure sensor configured to sense aircraft cabin pressure and supply a cabin pressure signal representative thereof;
an analog-to-digital converter (A/D) circuit coupled to receive the cabin pressure signal and operable, upon receipt thereof, to periodically sample the cabin pressure signal and supply digital cabin pressure values representative thereof;
a controller circuit configured to periodically read a predetermined number of the digital cabin pressure values supplied from the A/D circuit and to periodically compute (i) a single cabin pressure value from the predetermined number of digital cabin pressure values read thereby and (ii) aircraft cabin pressure rate of change based in part on the single aircraft cabin pressure value;
the controller circuit comprising:
two first order lag Tustin filters, each filter having a different time constant value; and
wherein the time constant values vary depending on a motor control law.

2. The system of claim 1, wherein:
the single cabin pressure value comprises an average cabin pressure value; and
the controller generates the average cabin pressure value by computing an average of the predetermined number of digital cabin pressure values.

3. The system of claim 1, further comprising:
a memory circuit coupled to receive and store the digital cabin pressure values supplied by the A/D circuit, wherein the controller circuit reads the predetermined number of digital pressure values from the memory circuit.

4. The system of claim 1, wherein:
the A/D circuit samples the cabin pressure signal at a predetermined sampling frequency;
the controller circuit reads the predetermined number of values at a predetermined computation frequency; and
the predetermined sampling frequency is greater than the predetermined computation frequency.

5. The system of claim 4, wherein the predetermined sampling frequency and the predetermined read frequency are specified such that the A/D circuit oversamples the cabin pressure signal.

6. The system of claim 4, wherein the predetermined sampling frequency is 100 times greater than the predetermined read frequency.

7. The system of claim 1, wherein
at least one of the Tustin filters is implemented with a time constant of either 0.06667 or 0.267.

8. The system of claim 1, wherein the Tustin filters are coupled in series.

9. The system of claim 1, wherein the Tustin lag filters are coupled in parallel.

10. The system of claim 1, further comprising:
a cabin temperature sensor configured to sense aircraft cabin temperature and supply a cabin temperature signal representative thereof;
a second A/D circuit coupled to receive the cabin temperature signal and operable, upon receipt thereof, to periodically sample the cabin temperature signal and supply digital cabin temperature values representative thereof,
wherein the controller circuit is further configured to periodically (i) read the digital cabin temperature values supplied from the second A/D circuit (ii) temperature compensate the determined average aircraft cabin pressure and (iii) supply temperature compensated cabin pressure data.

11. The system of claim 1, wherein the controller circuit is further configured to supply outflow valve position commands representative of a desired outflow valve position, the outflow valve position command based at least in part on the determined aircraft cabin pressure rate of change.

12. The system of claim 11, further comprising:
a motor coupled to receive the outflow valve position commands and operable, upon receipt thereof, to supply a drive force; and
an outflow valve coupled to receive the drive force and operable, upon receipt thereof, to move to the desired outflow valve position.

13. A circuit for determining aircraft cabin pressure rate of change, comprising:
an analog-to-digital converter (A/D) circuit adapted to receive an analog cabin pressure signal and operable, upon receipt thereof, to periodically sample the analog cabin pressure signal and supply digital cabin pressure values representative thereof;
a controller circuit configured to periodically read a predetermined number of the digital cabin pressure values supplied from the A/D circuit and to periodically compute (i) a single cabin pressure value from the predetermined number of digital cabin pressure values read thereby and (ii) aircraft cabin pressure rate of change based in part on the single aircraft cabin pressure value;
the controller circuit comprising:
a first-order lag Tustin filter having a time constant value equal to 0.06667; and
a second first-order lag Tustin filter having a time constant value equal to 0.267.

14. The circuit of claim 13, wherein:
the single cabin pressure value is an average cabin pressure value; and
the controller generates the average cabin pressure value by computing an average of the predetermined number of digital cabin pressure values.

15. The circuit of claim 13, further comprising:
a memory circuit coupled receive and store the digital cabin pressure values supplied by the A/D circuit,
wherein the controller circuit reads the predetermined number of digital pressure values from the memory circuit.

16. The circuit of claim 13, wherein:
the A/D circuit samples the cabin pressure signal at a predetermined sampling frequency;
the controller circuit reads the predetermined number of values at a predetermined read frequency; and
the predetermined sampling frequency is greater than the predetermined read frequency.

17. The circuit of claim 16, wherein the predetermined sampling frequency and the predetermined read frequency are such that A/D circuit oversamples the cabin pressure signal.

18. The circuit of claim 16, wherein the predetermined sampling frequency is 100 times greater than the predetermined read frequency.

19. A method of periodically computing aircraft cabin pressure rate of change for modulating cabin pressure, the method comprising the steps of:
sampling, at a predetermined sampling frequency, an analog aircraft cabin pressure signal to thereby generate digital cabin pressure values;
computing, at a predetermined computation frequency, an average of a predetermined number of the digital cabin pressure values to thereby generate average cabin pressure values, the predetermined computation frequency less than the predetermined sampling frequency; and
computing, at the predetermined computation frequency, aircraft cabin pressure rate of change values based on the average aircraft cabin pressure values includes the steps of:
filtering the average aircraft cabin pressure values to derive the cabin pressure rate of change using a digital filter circuit implemented with a time constant value equal to 0.06667;
filtering the average aircraft cabin pressure values to derive the cabin pressure rate of change using the digital filter circuit implemented with a time constant value equal to 0.267;
supplying the cabin pressure rate-of-change to a control law to produce an outflow valve position command signal; and
controlling the position of an outflow valve in response to the outflow valve position command signal, to thereby modulate cabin pressure.

20. The method of claim 19, wherein the step of computing aircraft cabin pressure rate of change comprises:
computing an average cabin pressure difference value; and
dividing the average cabin pressure difference value by an elapsed time value,
wherein the average cabin pressure difference value is computed by subtracting a previous average pressure value from a current average pressure value, and the elapsed time value is an amount of time between when the current average pressure value is computed and the previous average pressure value was computed.

21. The method of claim 19, wherein the predetermined sampling frequency is 100 times greater than the predetermined computation frequency.

22. The method of claim 19, wherein the predetermined number of digital cabin pressure values that are averaged is 100.

23. The method of claim 19 wherein the step of filtering the average aircraft cabin pressure values to derive the cabin pressure rate of change using the digital filter circuit implemented with a time constant value equal to 0.267 is performed subsequent to the step of filtering the average aircraft cabin pressure values to derive the cabin pressure rate of change using the digital filter circuit implemented with a time constant value equal to 0.06667.

24. The method of claim 19 wherein the step of filtering the average aircraft cabin pressure values to derive the cabin pressure rate of change using the digital filter circuit implemented with a time constant value equal to 0.267 is performed in parallel with the step of filtering the average aircraft cabin pressure values to derive the cabin pressure rate of change using the digital filter circuit implemented with a time constant value equal to 0.06667.

25. The method of claim 24 further comprising the step of multiplying the output of the digital filter circuit by a unity gain term to yield the cabin pressure rate-of-change.

* * * * *